United States Patent [19]

Peneder et al.

[11] Patent Number: 4,623,830
[45] Date of Patent: Nov. 18, 1986

[54] ALTERNATING-CURRENT MACHINE DRIVE

[75] Inventors: Franz Peneder, Fislisbach; Vojen Suchanek, Nussbaumen, both of Switzerland

[73] Assignee: BBC Brown, Boveri & Company, Limited, Baden, Switzerland

[21] Appl. No.: 629,464

[22] Filed: Jul. 10, 1984

[30] Foreign Application Priority Data

Jul. 13, 1983 [CH] Switzerland ............... 3831/83

[51] Int. Cl.$^4$ .............................................. H02P 5/40
[52] U.S. Cl. ................................. 318/798; 318/806; 363/39; 307/105
[58] Field of Search ............... 307/105; 318/798, 806, 318/729; 363/34, 35, 39, 40; 333/175

[56] References Cited

U.S. PATENT DOCUMENTS

| | | | |
|---|---|---|---|
| 2,241,832 | 5/1941 | Wahlquist | 307/105 |
| 3,395,327 | 7/1968 | Kaiser et al. | 307/105 |
| 3,501,686 | 3/1970 | Tveteras et al. | 363/39 |
| 3,555,291 | 1/1971 | Dewey | 307/105 |
| 3,859,542 | 1/1975 | Kennedy | 307/105 |
| 3,881,137 | 4/1975 | Thanawala | 307/105 |
| 4,039,926 | 8/1977 | Steigerwald | 323/207 |
| 4,308,575 | 12/1981 | Mase | 363/35 |
| 4,355,241 | 10/1982 | Hingorani | 307/105 |

Primary Examiner—David Smith, Jr.
Attorney, Agent, or Firm—Oblon, Fisher, Spivak, McClelland & Maier

[57] ABSTRACT

In this context, a frequency converter generates a multiphase alternating current of variable frequency which current feeds an alternating-current machine via alternating-current lines into which for each alternating current phase line one commutating choke is integrated for limiting the change of current with respect to time di/dt. Since the efficiency of a synchronous motor is best when fed with a sinusoidal alternating current, a frequency-variable filter is provided as a bypass circuit to the synchronous motor which makes the alternating current sinusoidal within a predeterminable frequency range. The frequency of the alternating current is measured with a frequency meter and monitored for exceeding a limit in a frequency limit detector. The filter can be tuned step-by-step by means of switching signals to different frequencies by changing the inductance or capacitance of series-tuned circuits step-by-step. Undesirable harmonic frequencies can thus be attenuated with-in a relatively large frequency range.

7 Claims, 4 Drawing Figures

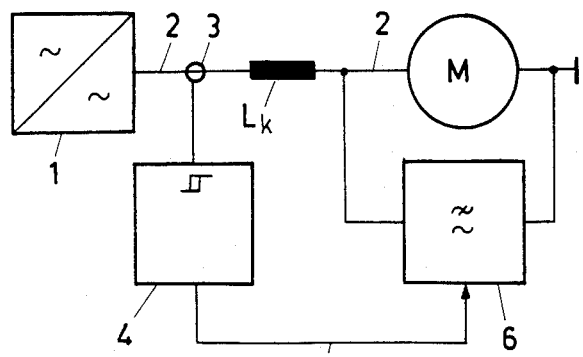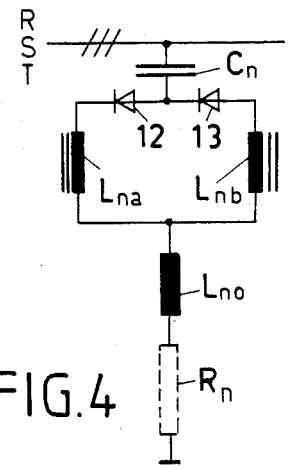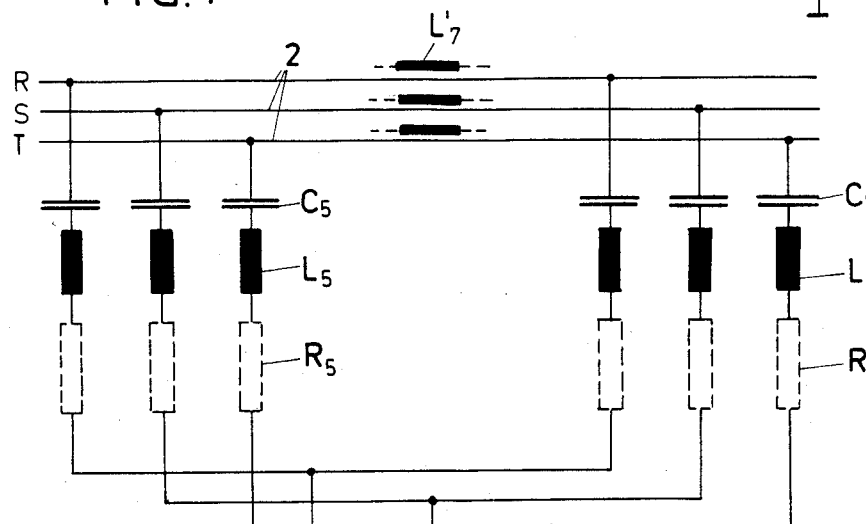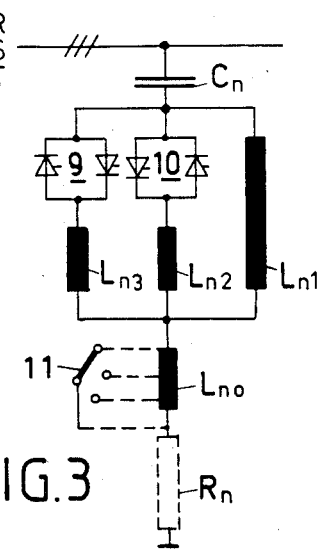

ALTERNATING-CURRENT MACHINE DRIVE

BACKGROUND OF THE INVENTION

1. Field of the Invention

This invention relates generally to an alternating-current mechanism drive and more specifically to alternating-current machine drive with filters for removing some of the harmonics from the alternating current.

2. Description of the Prior Art

Alternating-current machine drives such as are described in the Swiss House Journal Brown Boveri Mitteilungen 10 (1980), pages 577–583 are known in the art. In this journal, drives of synchronous motors are described which are fed by 6- and 12-pulse frequency converters. In order to reduce the power losses to the motor, the 5th and 7th harmonics are eliminated at the mains and motor side by using 12-pulse frequency converters. In order to start up synchronous motors where the load has a very high load or counter torque, it is known to use a 24-pulse inverter circuit. As a result of this measure, power harmonics and thus also the heating of the rotor can be further reduced. 24-pulse inverter circuits, however, have elaborate connections and are expensive.

Converters make it possible to generate an alternating current having a predeterminable number of phases and a variable frequency and thus a speed-controlled drive without interposing a speed-transforming transmission possible. The alternating current generated, however, is not sinusoidal as is required by the alternating-current motors so that irregular running, undesirable pulsating torques, increased rotor temperatures and, finally, a relatively low motor efficiency are produced if no or insufficient measures are taken to make the alternating current sinusoidal.

Such drives with variable frequency are used, for example, for boiler feed pumps, cement tube mills, turbocompressors, mine hoist drives, dredger drives, gas turbines, static-converter synchronous generator systems for wind-driven and hydroelectric power stations and for fans.

SUMMARY OF THE INVENTION

Accordingly, one object of this invention is to provide a novel alternating-current machine drive.

Another object of this invention is to provide a new and improved alternating-current machine drive with filters for removing harmonics.

A further object of the invention is to provide an alternating-current machine with reduced pulsating torque.

A still further object of this invention is to provide an efficient alternating-current machine fed by a converter with variable frequency.

Another object of this invention is to provide an alternating-current machine having less vibration and running more quietly.

A further object of this invention is to provide an alternating-current machine which is more efficient, runs cooler and requires less energy.

These and other objects of is invention are achieved with relatively few circuit elements by means of series-tuned circuits having a suitably dimensioned, frequency-dependent resistive impedance. By switching chokes or choke sections in and out of the circuit, the frequency range for which the harmonic frequencies are filtered out can be expanded or displaced in steps as a function of the frequency of the inverter. A continuous displacement of the filter frequency range is possible with two chokes having a ferromagnetic core if the chokes are operated close to the saturation region of the cores and remagnetisations of the cores are avoided.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram of an alternative-current machine drive having a frequency-variable filter;

FIG. 2 is a filter designed for the 5th and 7th harmonic frequency according to FIG. 1, having 6 series-tuned circuits for 3-phase alternating current;

FIG. 3 is a series-tuned circuit according to FIG. 2 for an nth harmonic frequency having filter chokes and filter choke sections which can be switched in and out of circuit in steps; and FIG. 4 is a series-tuned circuit according to FIG. 2 for an nth harmonic frequency having two additional filter chokes with a ferro magnetic core for continuously changing the resonant frequency of the series-tuned circuit.

DETAILED DESCRIPTION OF THE PREFERRED EMBODIMENTS

Referring now to the drawings, wherein like reference numerals designate identical or corresponding parts throughout the several views, and more particularly to FIG. 1 thereof, where 1 designates a frequency converter which is used for converting an alternating current with a certain frequency and number of phases into an alternating current having an identical or different number of phases and a different, variable frequency. Preferably, a frequency converter having a direct-current intermediate circuit is used which takes energy from an alternating or 3-phase mains system via a rectifier and feeds 6-pulse alternating current to an alternating-current load via a system or self-quenched inverter, the current in the intermediate circuit being kept constant with the aid of a choke.

The frequency converter 1 provides power to an alternating-current machine M via alternating-current lines 2 the number of which is equal to the number of phases of the alternating current. For power of up to 2 MW, asynchronous machines are advantageously used and, for power of more than 2 MW, synchronous machines are used. Between the frequency converter 1 and the alternating-current machine M, a commutating choke $L_k$ is connected into each alternating current line 2 for limiting the change of current with respect to time $di/dt$. A frequency-variable filter 6 is provided as a bypass to or in parallel with the alternating-current machine M which filters out or shorts out undesirable harmonics in the alternating current supplied by the frequency converter 1 so that the alternating-current machine obtains a nearly sinusoidal alternating current over a predeterminable frequency or speed range. This makes it possible to improve the efficiency of the alternating-current machine.

In operation, the frequency of the alternating voltage generated by the frequency converter 1 is changed in accordance with the speed required of the alternating-current machine and especially of a synchronous motor. Corresponding to this frequency change, the frequencies of the harmonics to be filtered out also change. This frequency-variable filter 6 filters out not only the harmonics M the nominal frequency of the synchronous motor but also those of a predeterminable range of frequencies in which the synchronous motor is predominantly operated.

The frequency of the alternating current is measured at the alternating-current line 2 by means of a frequency meter 3 and compared in a frequency limit detector 4, connected to the frequency meter, to at least one predeterminable limit frequency. If the frequency measured exceeds this predeterminable limit value, a switching signal is transferred via a switching-signal line 5 to the frequency-variable filter 6 and there actuates an alternating-current switch.

FIG. 2 shows a frequency-variable filter 6 according to FIG. 1. To each phase line R, S, T of the alternating-current lines 2, a filter is connected for the 5th and 7th harmonic frequency. $C_5$ and $C_7$ designate filter capacitors, $L_5$, $L_7$, $L_7'$ filter chokes, $R_5$ and $R_7$ frequency-dependent impedances of the associated filter chokes and 7 and 8 alternating-current switches having thyristors connected in anti-parallel. The harmonics of the filter are designated by the subscripts 5 and 7. The filters connected at the input to the same phase conductor are connected to each other at the output. Instead of the filter chokes $L_7$ or in addition to thereto, filter line chokes $L_7'$, indicated by dashes, can also be used which are then connected into the phase lines R, S, T at the point drawn and simultaneously act as commutating chokes.

$L_x$ designates add-on chokes and $R_x$ their resistive, frequency-dependent impedances.

The alternating-current switches 7 and 8 can be switched in dependence on the switching signal from the frequency limit detector 4. If the two alternating-current switches are open, an add-on choke $L_x$ is series-connected for each phase to the outputs of the filters of this phase. If the alternating-current switches 7 and 8 are closed, the add-on chokes are short-circuited as are the outputs of the phase filters of all phases with respect to each other. In addition, one output of each add-on choke $L_x$ is connected to one output of each other add-on choke $L_x$.

For a p-pulse frequency converter 1, the number n of the harmonics to be filtered out is found from:

$$k = np \pm 1, \; n = 1, 2, 3, \quad (1)$$

The following applies to the current amplitude $I_n$ of the nth harmonic:

$$I_n = I_1/n, \quad (2)$$

where $I_1$ is the current amplitude of the fundamental. In the case of a 6-pulse frequency converter with the 5th, 7th, 11th, 13th, 17th ... harmonics, therefore, the essential factor is that the 5th and 7th harmonics are filtered out. As filters, series-tuned circuits consisting of a capacitor (capacity C) connected in series with a choke (inductance L) are used which represent a short circuit for the respective current harmonics (resonance). The following applies to a series-turned circuit for an nth order harmonic:

$$LC = 1/(n\omega)2, \quad (3)$$

where $\omega$ is the angular frequency of the fundamental. The capacitor must be capable of conducting the current $$I_{cn} \approx \omega C \, U_E + I_n \quad (4)$$

where $U_E$ = the effective value of the system-volage fundamental, $I_n$ = the effective value of the nth current harmonic, and must be designed for a power $$P_C \approx \omega C U_E^2 + I_n^2 / n\omega C \quad (5)$$

The capacitor power is at a minimum with $$C = \frac{1}{\sqrt{n}} \; \frac{I_n}{\omega U_E}. \quad (6)$$

With the maximum possible value of C, the inductance for the respective harmonic can be calculated from equation (3).

The amount of alternating-current impedance, that is to say the impedance of the alternating-current machine $Z_M$ be taken into consideration during the calculation of $I_n$, in accordance with:

$$I_n/I_0 = Z_S/Z_M, \quad (7)$$

where $I_0$ is the mean ideal direct-current component of the alternating current and $Z_S$ is the sum impedance for which the following applies:

$$1/Z_S = 1/Z_M + \Sigma 1/Z_n, \quad (8)$$

where $$Z_n = j\omega L_n + 1/j\omega C_n + R_n \quad (9)$$

and $$R_n = R_{n0} + \omega R_{n1} + \omega^2 R_{n2}. \quad (10)$$

$R_{n0}$, $R_{n1}$ and $R_{n2}$ are constants. During the calculation $R_{n2}$ can be neglected in a first approximation.

For a 10-MW synchronous motor designed for a nominal frequency $f_N$ of 100 Hz and having an inductance of $L_M = 529$ μH, where $R_M = R_{M0} + \omega R_{M1}$ with $R_{M0} = 0$ and $R_{M1} = 42$ μΩ, and using capacitors having different values of capacity, for a 6-pulse frequency converter, for example, the following filter data are obtained for the 5th and 7th harmonics, the values being selected such as to provide as wide as possible a frequency range:

EXAMPLE 1

$C_5 = 110$ μF, $L_5 = 920$ μH, $R_{50} = 7,9$ mΩ, $R_{51} = 13$ μΩ
$C_7 = 160$ μF, $L_7 = 320$ μH, $R_{70} = 8,5$ mΩ, $R_{71} = 11$ μΩ

EXAMPLE 2

$C_5 = 90$ μF, $L_5 = 1,1$ mH, $R_{50} = 5,2$ mΩ, $R_{51} = 8,6$ μΩ
$C_7 = 135$ μF, $L_7 = 380$ μH, $R_{70} = 4$ mΩ, $R_{71} = 5,5$ μΩ

With such a filter design, the best attenuation of the 5th and 7th harmonic frequencies is achieved for the 100 Hz fundamental and an effective attenuation within the frequency range from about 90 Hz to 108 Hz. If the frequency of the alternating current drops, for example, below the frequency limit of 90 Hz, the alternating-current switches 7 and 8 are switched off, which connects the add-on chokes $L_x$ to the series-tuned circuits of each alternating-current phase. The inductance of the add-on chokes $L_x$ is dimensioned in such a manner that they produce optimum attenuation both of the 5th and of the 7th harmonic frequencies for about 86 Hz. In this manner, an effective attenuation of the undesirable harmonic frequencies and thus good efficiency and a reduction of the pulsating torques of the alternating-current machine can be achieved from about 80 Hz to 108 Hz.

FIG. 3 shows a series-tuned circuit, which is connected at the input to one of the three-phase phase lines R, S, T, for an nth harmonic frequency, wherein instead of a single filter choke $L_n$ a main filter choke $L_{n0}$ having several taps is provided in series with three add-on filter chokes $L_{n1}$, $L_{n2}$, $L_{n3}$ for the nth harmonic, the three add-on filter chokes being connected in parallel with one another. The add-on filter chokes $L_{n2}$ and $L_{n3}$ are in each case connected in parallel with parallel-connected thryristors via series-connected alternating current switches 10 and 9, respectively. $R_n$ designates the frequency-dependent resistive impedance of the filter chokes and $C_n$ a filter capacitor for the nth harmonic. The series-tuned circuit is grounded at the output. The taps, drawn with dashes, of the main filter choke $L_{n0}$ are connected via an electronic stepping switch 11 to the ground output of the main filter choke. The dashing is intended to indicate that this stepping switch can be provided as an alternative to the add-on possibilities of the add-on filter chokes $L_{n2}$ and $L_{n3}$ or in addition to these.

By reducing or increasing the series-tuned circuit inductance in steps, the frequency range in which the series-tuned circuit is operative can be changed. The switching of add-on filter chokes and main filter choke sections in and out of the circuit is done by switching signals as a function of predeterminable frequency limits.

FIG. 4 shows a series-tuned circuit, which is connected at the input to one of the three-phase lines R, S, T, for an nth harmonic frequency, which circuit is grounded at the output. The current also has a filter capacitor $C_n$, a main filter choke $L_{n0}$ and two add-on filter chokes $L_{na}$ and $L_{nb}$ which are connected in parallel with each other and in series with the main filter choke and have a ferromagnetic core. In series with each of these add-on filer chokes. $L_{na}$ and $L_{nb}$, diodes 12 and 13 are connected which conduct in the same direction so that only the positive half-cycle of the current can pass through the add-on filter choke $L_{na}$ and only the negative half-cycle of the current through the add-on filter choke $L_{nb}$. The add-on filter chokes $L_{na}$ and $L_{nb}$ are operated close to the saturation region of the ferromagnetic cores. Their inductances are dimensioned in such a manner that the ferromagnetic cores are not saturated for frequencies below the frequencies to be filtered out and are saturated above these frequencies, which corresponds to a reduction in inductance. This makes it possible to make the resonant frequency of the series-tuned circuit continuously variable. $R_n$ again designates the frequency-dependent resistive impedance of the filter chokes.

The invention is naturally not restricted to what is shown in the drawings. Thus, a step-by-step change of the resonant frequency of the series-tuned circuits can be carried out by a step-by-step change of the capacity of the filter capacitors instead of a step-by-step change of the inductance. In this arrangement, several parallel-connected capacitors are used which can be switched in and out of circuit in steps via alternating-current switches. This measure can also be applied in addition to the measures described for changing the inductance of the filter chokes.

The measures described can be used for producing frequency-variable filters, in particular for nominal frequencies within the range of from 4 Hz to 200 Hz which are of particular interest for frequency-variable drives. The filters are provided with line-balance protection, known per se, and an overvoltage protection, which are not the subject matter of the invention and are not shown for this reason.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An alternating-current machine drive, comprising:
   a multiphase alternating-current machine;
   a frequency converter generating an alternating current with a predeterminable variable frequency;
   alternating current lines connecting said machine to said converter;
   a frequency-variable filter having a resonance frequency and connected in parallel with said machine for filtering out at least one harmonic of said alternating current;
   means for varying the resonance frequency of said filter as a function of the variable frequency of the current generated by said frequency converter;
   said filter including for each phase of said alternating current and for each of said harmonics to be filtered out one series-tuned circuit tuned to the respective harmonic;
   each of said series-tuned circuits having a filter capacitor connected in series with a filter choke;
   said filter choke including a frequency-dependent resistive impedance;
   each of said series-tuned circuits being connected at the input of said alternating-current lines; and
   wherein:
   series-tuned filters which are connected at the input to the same one of said alternating-current lines are connected at the output together and to one end of an add-on choke;
   said add-on chokes being connected together at the other end; and
   series-tuned filters which are connected at the input to different ones of said alternating-current lines are connected at the output to each other by way of alternating-current switches which produce a short circuit when said switches are actuated.

2. An alternating-current machine drive, comprising:
   a multiphase alternating-current machine;
   a frequency converter generating an alternating current with a predeterminable variable frequency;
   alternating current lines connecting said machine to said converter;
   a frequency-variable filter having a resonance frequency and connected in parallel with said machine for filtering out at least one harmonic of said alternating current;

means for varying the resonance frequency of said filter as a function of the variable frequency of the current generated by said frequency converter;

said filter including for each phase of said alternating current and for each of said harmonics to be filtered out one series-tuned circuit tuned to the respective harmonic;

each of said series-tuned circuits having a filter capacitor connected in series with a filter choke;

said filter choke including a frequency-dependent resistive impedance;

each of said series-tuned circuits being connected at the input to said alternating-current lines; and wherein:

said filter choke includes a main filter choke in series with at least two further add-on filter chokes which are connected in parallel with each other by way of one current rectifier.

3. An alternating-current machine drive according to claim 2, wherein said current rectifier is an alternating-current switch with anti-parallel connected thyristors.

4. An alternating-current machine drive, comprising:
a multiphase alternating-current machine;
a frequency converter generating an alternating current with a predeterminable variable frequency;
alternating current lines connecting said machine to said converter;
a frequency-variable filter having a resonance frequency and connected in parallel with said machine for filtering out at least one harmonic of said alternating current;
means for varying the resonance frequency of said filter as a function of the variable frequency of the current generated by said frequency converter;
said filter including for each phase of said alternating current and for each of said harmonics to be filtered out one series-tuned circuit tuned to the respective harmonic;
each of said series-tuned circuits having a filter capacitor connected in series with a filter choke;
said filter choke including a frequency-dependent resistive impedance;
each of said series-tuned circuits being connected at the input to said alternating-current lines;
said filter choke including a main filter choke in series with at least two further add-on filter chokes which are connected in parallel with each other by way of one current rectifier;
wherein:
said add-on filter chokes are each provided with a ferromagnetic core;
said current rectifiers are connected in series with each of said add-on filter chokes; and
said current rectifiers conduct in the same direction such that only one half cycle of said alternating current passes through each add-on filter choke.

5. An alternating-current machine drive according to claim 4, wherein the inductance of the said add-on chokes are not saturated for frequencies below the frequency of the harmonic to be filtered out and are saturated above said frequency.

6. An alternating-current machine according to claim 4, wherein said filter choke has several taps connected to the output by way of a stepping switch.

7. An alternating-current machine drive according to claim 4, wherein one series-tuned circuit for each of the harmonics to be filtered out is connected between one of the alternating current lines and each of the other of said alternating-current lines.

* * * * *